United States Patent
Hong et al.

(10) Patent No.: US 8,668,992 B2
(45) Date of Patent: Mar. 11, 2014

(54) FLUORINATED POLYIMIDES WITH FLUORENE CARDO STRUCTURE AS OPTICAL MATERIALS THAT HAVE LOW ABSOLUTE THERMO-OPTIC COEFFICIENTS

(75) Inventors: Wenbin Hong, Rolla, MO (US); Tantiboro Ouattara, Eureka, MO (US); Heping Wang, Rolla, MO (US); Kang Le Wang, legal representative, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 264 days.

(21) Appl. No.: 13/150,946

(22) Filed: Jun. 1, 2011

(65) Prior Publication Data

US 2012/0308835 A1 Dec. 6, 2012

(51) Int. Cl.
*B32B 17/10* (2006.01)
*B32B 27/06* (2006.01)
*C08F 16/24* (2006.01)
*B05D 5/06* (2006.01)
*C08G 73/10* (2006.01)

(52) U.S. Cl.
USPC ........ 428/473.5; 428/435; 526/247; 524/544; 524/104; 524/111; 524/233; 524/173; 427/164

(58) Field of Classification Search
None
See application file for complete search history.

(56) References Cited

U.S. PATENT DOCUMENTS

| | | | |
|---|---|---|---|
| 5,032,654 A | 7/1991 | Wieners et al. | |
| 5,039,566 A | 8/1991 | Skubic et al. | |
| 5,049,649 A | 9/1991 | Rohitkumar | |
| 5,108,201 A | 4/1992 | Matsuura et al. | |
| 5,665,450 A | 9/1997 | Day et al. | |
| 6,040,418 A | 3/2000 | Yamamoto et al. | |
| 6,818,306 B2 | 11/2004 | Miller et al. | |
| 7,094,361 B2 | 8/2006 | Riman et al. | |

OTHER PUBLICATIONS

Wang et al., Polymer Degradation and Stability 94 (2009) 1746-1753, Novel fluorinated polyimides derived from 9,9-bis(4-amino-3,5-difluorophenyl)fluorene and aromatic dianhydrides.*
J. Brandup, et al., eds., Polymer Handbook, 4th ed., 1999, John Wiley & Sons, New York, pp. 573-578.
Tamaki et al., "Recent Progress on Polymer Waveguide Materials," 2003, Journal of Photopolymer Science and Technology, vol. 16, No. 5, 639-648.
Terui et al., "Anisotropy in therm-optic coefficients of polyimide films formed on Si substrates," 2003, Applied Physics Letter, vol. 83, No. 23, 4755-4757.
Zhang et al., "Thermo-optic coefficients of polymers for optical waveguide applications," 2006, Polymer, vol. 47, 4893-4896.
Matsuura et al., "Polyimides Derived from 2,2'-Bis(trifluoromethyl)-4,4'-diaminobiphenyl. 4. Optical Properties of Fluorinated Polyimides for Optoelectronic Components," 1994, Macromolecules, vol. 27, pp. 6665-6670.

* cited by examiner

*Primary Examiner* — Sheeba Ahmed
(74) *Attorney, Agent, or Firm* — Hovey Williams LLP

(57) ABSTRACT

The present invention provides new polyimide materials suitable for use in optically transparent fiber composites, ribbon composites, and optical communications applications. The polyimide compounds include monomeric repeat units comprising a fluorinated moiety and a fluorene cardo structure. The polyimides exhibit good optical transparency and have a low absolute thermo-optic coefficient (|dn/dT|).

27 Claims, No Drawings

FLUORINATED POLYIMIDES WITH FLUORENE CARDO STRUCTURE AS OPTICAL MATERIALS THAT HAVE LOW ABSOLUTE THERMO-OPTIC COEFFICIENTS

FEDERALLY SPONSORED RESEARCH OR DEVELOPMENT

This invention was made with government support under contract number W911NF-07-2-0062 awarded by U.S. Army Research Lab. The United States Government has certain rights in the invention.

BACKGROUND OF THE INVENTION

1. Field of the Invention

The present invention relates to polyimide materials having improved optical transparency and low absolute thermo-optic coefficient (|dn/dT|) that are useful in optically transparent fiber composites (OTFCs), optically transparent ribbon composites (OTRCs), and optical communication devices.

2. Description of Related Art

The thermo-optic coefficient (thermally induced change in refractive index, dn/dT) of polymeric materials has attracted much attention due to their suitability for use in transparent composites (e.g., OTFCs or OTRCs) and optical communications. One type of transparent composite is made up of glass fibers or ribbons bound together with a polymeric material acting as a binder. Transparency in these composites is achieved by matching the refractive index (n) of the glass fibers or ribbons to that of the polymeric material. One problem encountered in such composites is that changes in temperature result in changes of the refractive index for each material, causing them to become mismatched and thereby reducing optical clarity of the composite. For example, the dn/dT of glass is between about 1 to $10 \times 10^{-6}/°$ C. while the dn/dT for most polymers is between about $(-100)$ to $(-300) \times 10^{-6}/°$ C. Past efforts at creating OTRCs have used epoxy binders with dn/dT values of about $-200 \times 10^{-6}/°$ C. However, a significant improvement in transparency across a range of working temperatures (e.g., $-40°$ to $125°$ F.) could be achieved if a polymer matrix material with an absolute thermo-optic coefficient (|dn/dT|) of less than about $100 \times 10^{-6}/°$ C. and more preferably, less than about $50 \times 10^{-6}/°$ C., could be developed.

The thermo-optic coefficient is also important in optical communications, especially in optical devices. Polymer optical devices are easier to process and more cost-effective than those made of inorganic materials, such as glass, which are fragile, expensive, and time-consuming to fabricate. In addition, the larger |dn/dT| of polymers over glass favors less power consumption and higher speed response for the optical devices. Therefore, intense efforts have been put forth to investigate the thermo-optic coefficient of a number of polymers, including PMMA, epoxy, polystyrene, and polyimides.

The refractive index of solid polymers is determined to a large extent by two factors: the inherent molecular composition of the polymer and the density of the molecules. When the ambient temperature changes, the resulting change in refractive index is attributable to a change in material density since the composition remains the same. Unlike glasses, polymeric materials tend to expand with temperature, which leads to a decrease in refractive index. Thus, polymers with a rigid structure are advantageous in reducing the thermo-optic coefficient. However, rigid polymers usually have poor solvent solubility, leading to poor processability. Thus, there remains a need for polymers having sufficient rigidity without sacrificing solubility and processability. There is also a need for polymers having improved optical transparency throughout the optical wavelength range (400-700 nm).

SUMMARY OF THE INVENTION

The present invention is broadly concerned with polyimide compounds useful in forming optically transparent composites and optical communications devices. The invention provides a polymer comprising recurring monomeric units of the following formula:

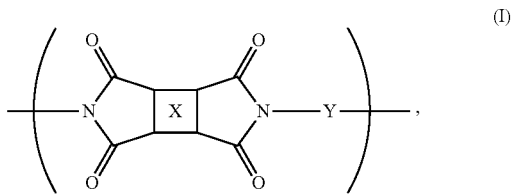

wherein at least one of X or Y comprises a fluorinated moiety and the other of X or Y comprises a fluorene derivative.

The invention also provides an optically transparent composition comprising a polymer dispersed or dissolved in a solvent system. The polymer comprises recurring monomeric units of formula (I).

The invention is also concerned with the combination of a substrate having a surface and an optically transparent film adjacent the substrate surface. The film comprises a polymer comprising recurring monomeric units of formula (I).

A method of forming an optically transparent composite is also provided. The method comprises providing a substrate having a surface, forming an optically transparent film on the substrate surface, and hot pressing the film to yield the optically transparent composite. The film comprises a polymer comprising recurring monomeric units of formula (I).

An optically transparent composite is also provided. The composite comprises a polymer matrix and a filler embedded in or bonded to the polymer matrix. The polymer matrix comprises a polymer comprising recurring monomeric units of formula (I).

DETAILED DESCRIPTION

The present invention is concerned with new polyimide compounds, compositions, and methods of using the same. In general, the polyimides include monomeric repeat units comprising a fluorinated moiety and a fluorene cardo structure. More specifically, the polyimides comprise recurring (repeating) monomeric units of the following formula:

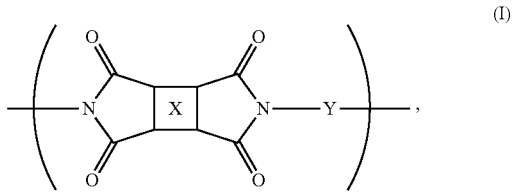

wherein at least one of X or Y comprises a fluorinated moiety and the other of X or Y comprises a fluorene derivative. The polyimides can be formed by any suitable process, with a preferred synthesis method including reacting a diamine component and a dianhydride component in an organic solvent, followed by imidization (chemical or thermal). The polyimides can optionally be endcapped by inert or active functional groups. If desired, the active functional groups can lend crosslinking characteristics to the polymer.

In one embodiment. X comprises a fluorinated moiety, and Y comprises a fluorene derivative. Preferably, X in this embodiment is a tetravalent residue of a fluorinated aromatic compound and more preferably is selected from the group consisting of fluorinated aromatic organic compounds having from about 6 to about 50 carbon atoms, and more preferably from about 6 to about 20 carbon atoms. Even more preferably, X is selected from the group consisting of fluorinated pyromellitic groups (e.g., 1,4-bis(trifluoromethyl)-2,3,5,6-benzene tetracarboxylic anhydride), fluorinated polycyclic groups (such as naphthylene, fluorenylene, benzofluorenylene, and anthracenylene), and moieties of the following formula

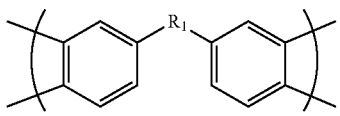

where $R_1$ is selected from the group consisting of —C(CF$_3$)$_2$—, —CF$_2$—, and —C(CF$_3$)(CH$_3$)—.

In this embodiment, Y is preferably a divalent fluorene compound, and more preferably one selected from the group consisting of fluorene diamine derivatives, phenoxy fluorene diamine derivatives, and combinations thereof More preferably, Y is selected from the group consisting of

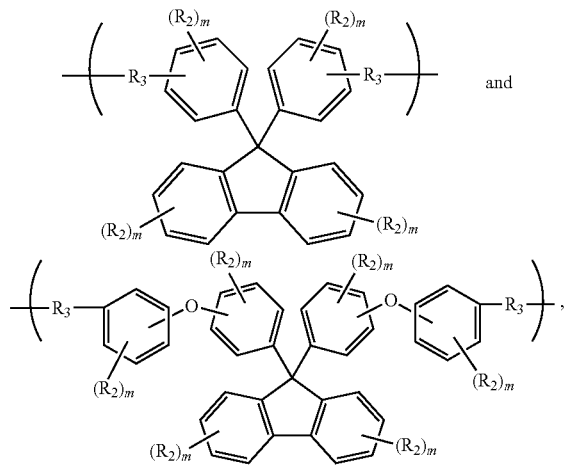

where each m is individually 0 to 4, each $R_2$ is individually selected from the group consisting of halogen, alkyl (preferably $C_1$-$C_{12}$, more preferably $C_1$-$C_8$), hydroxyl, carboxyl, sulfone, nitro, cyano, and substituted (preferably by 1 to 4 halogen atoms) and unsubstituted phenyl groups, and each $R_3$ is individually selected from the group consisting of alkyl (preferably $C_1$-$C_{12}$, more preferably $C_1$-$C_8$), alkoxy (preferably $C_1$-$C_{12}$, more preferably $C_1$-$C_8$), phenyl, and phenoxy groups. As will be appreciated by one or ordinary skill in the art, the foregoing $R_3$ groups would be divalent groups, in light of their positions within the above structures.

Exemplary fluorene diamine derivatives for use in forming the inventive polyimides of this embodiment are selected from the group consisting of 9,9-bis(4-aminophenyl)fluorene, 9,9-bis(3-methyl-4-aminophenyl)fluorene, 9,9-bis(3,5-dimethyl-4-aminophenyl)fluorene, 9,9-bis(3,5-diethyl-4-aminophenyl)fluorene, 9,9-bis(3-ethyl-5-methyl-4-aminophenyl)fluorene, 9,9-bis(3-bromo-4-aminophenyl)fluorene, 4-chloro-9,9-bis(3,5-diethyl-4-aminophenyl)fluorene, 9,9-bis(4-aminophenyl)fluorene-4-carboxylic acid, 9,9-bis(3,5-dimethyl-2,6-difluoro-4-aminophenyl)fluorene, 9,9-bis(4-aminophenyl)fluorene-4-methoxy, 9,9-bis(4-aminophenyl)fluorene-4-sulfone, 9,9-bis(4-aminophenyl)fluorene-4-methyl, and mixtures thereof. Exemplary phenoxy fluorene diamine derivatives for use in forming the inventive polyimides of this embodiment are selected from the group consisting of 9,9-bis[4-(4-aminophenoxy)phenyl]fluorene, 9,9-bis[3-methyl-4-(4-amino-phenoxy)]fluorene, 9,9-bis[3,5-dimethyl-4-(4-amino-phenoxy)fluorene, 9,9-bis[3,5-diethyl-4-(4-aminophenoxy)]fluorene, 9,9-bis[3-ethyl-5-methyl-4-(4-aminophenoxy]fluorene, 9,9-bis[3-bromo-4-(4-aminophenoxy)]fluorene, 4-chloro-9,9-bis[3,5-diethyl-4-(4-amino-phenoxy)]fluorene, 9,9-bis[4-(4-aminophenoxy)]fluorene-4-carboxylic acid, 9,9-bis[3,5-dimethyl-2,6-difluoro-4-(4-aminophenoxy)]fluorene, 9,9-bis[4-(4-aminophenoxy)]fluorene-4-methoxy, 9,9-bis[4-(4-aminophenoxy)]fluorene-4-sulfone, 9,9-bis[4-(4-aminophenoxy)]fluorene-4-methyl, and mixtures thereof.

In another embodiment, X comprises a fluorene derivative and Y comprises a fluorinated moiety. Preferably, X is a tetravalent residue of a phenoxy fluorene derivative, and more preferably is selected from the group consisting of tetravalent moieties of the following formula

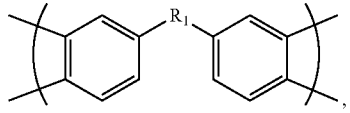

where $R_1$ is selected from the group consisting of —(O—$R_4$—O)—, and $R_4$ is selected from the group consisting of:

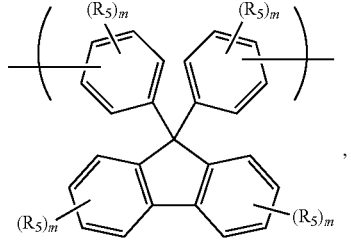

where each m is individually 0 to 4, each $R_5$ is individually selected from the group consisting of halogen, alkyl (preferably $C_1$-$C_{12}$, more preferably $C_1$-$C_8$), hydroxyl, carboxyl, sulfone, nitro, cyano, substituted (preferably by 1 to 4 halogen atoms) and unsubstituted phenyl groups. A particularly preferred phenoxy fluorene derivative for use in forming the inventive polyimides of this embodiment is 9,9-bis[4-(3,4-dicarboxyphenoxy)phenyl]fluorene dianhydride or a substituted derivative thereof.

In this embodiment, Y is preferably a fluorinated aromatic moiety, selected from the group consisting of

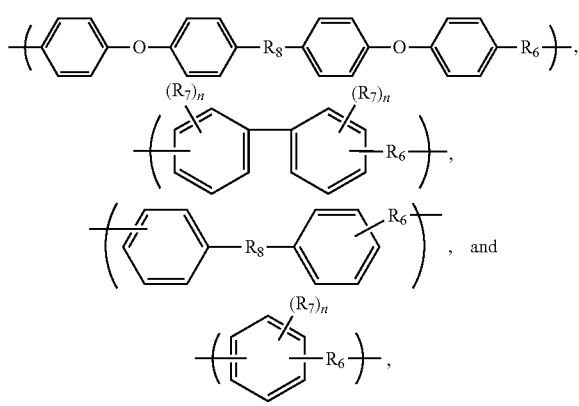

where:
  each n is individually 1 to 4;
  each $R_6$ is individually selected from the group consisting of alkyl (preferably $C_1$-$C_{12}$, more preferably $C_1$-$C_8$), alkoxy (preferably $C_1$-$C_{12}$, more preferably $C_1$-$C_8$), phenyl, and phenoxy groups (in divalent form, in light of positioning within the above structures);
  each $R_7$ is individually selected from the group consisting of —F, —$CF_3$, and —$(CH_2)_k(CF_2)_jCF_3$, where:
    k is 0 to 8, more preferably 1 to 8, and more preferably 1 to 4; and
    j is 0 to 20, more preferably 1 to 20, and more preferably 1 to 4; and
  each $R_8$ is individually selected from the group consisting of —$C(CF_3)_2$—, —$CF_2$—, and —$C(CF_3)(CH_3)$—.

Exemplary fluorinated aromatic diamines for use in forming the inventive polyimides of this embodiment are selected from the group consisting of 2,2-bis(4-aminophenyl) hexafluoropropane, 2,2-bis(3-amino-4-methylphenyl) hexafluoropropane, 2,2-bis(3-amino-4-hydroxyphenyl) hexafluoropropane, 2,2'-bis(trifluoromethyl)benzidine, 3,3'-bis(trifluoromethyl)benzidine, 2,2-bis[4-(4-aminophenoxy)phenyl]hexafluoropropane, 4,4'-diaminooctafluoro biphenyl, 2,5-diaminobenzotrifluoride,3,5-diaminobenzotrifluoride, and mixtures thereof.

Regardless of the embodiment, the polyimides preferably have a weight average molecular weight of from about 3,000 Daltons to about 300,000 Daltons, more preferably from about 10.000 Daltons to about 100,000 Daltons, and even more preferably from about 30,000 Daltons to about 60,000 Daltons. The polyimides are thermally stable and preferably have absolute thermo-optic coefficients (|dn/dT|) in the range of from about $30\times10^{-6}$/° C. to about $120\times10^{-6}$/° C., more preferably from about $30\times10^{-6}$/° C. to about $80\times10^{-6}$/° C., and even more preferably from about $30\times10^{-6}$/° C. to about $60\times10^{-6}$/° C., at temperatures ranging from about 25° C. to about 80° C. The polyimides also preferably have a glass transition temperature ($T_g$), as determined by differential scanning calorimetry, of from about 100° C. to about 300° C., more preferably from about 150° C. to about 250° C., and even more preferably from about 180° C. to about 250° C. The polyimides also preferably have a low dielectric constant, low moisture absorption, and good processability, making them ideal for use in transparent composites and optical applications.

In a further aspect of the invention, an optically transparent composition is provided. In one embodiment, the composition comprises polyimides of formula (I) dispersed or dissolved in a solvent system. The polyimides should be present in the composition at a level of from about 5% to about 95% by weight, more preferably from about 10% to about 50% by weight, and more preferably from about 15% to about 30% by weight, based upon the total weight of the composition taken as 100% by weight. Suitable solvent systems will preferably comprise a polar solvent selected from the group consisting of N-methyl pyrrolidone, γ-butyrolactone, N,N'-dimethyl formamide, dimethyl sulfoxide, N,N'-dimethyl acetamide, and mixtures thereof. The solvent system should be utilized at a level of from about 5% to about 95% by weight, preferably from about 50% to about 90% by weight, and more preferably from about 70% to about 85% by weight, based upon the total weight of the composition taken as 100% by weight. The total solids in the composition preferably range from about 5% to about 95% by weight, more preferably from about 10% to about 50% by weight, and even more preferably from about 15% to about 30% by weight, based upon the total weight of the composition taken as 100% by weight.

In some embodiments, the composition consists essentially (or even consists) of the polyimide dispersed or dissolved in the solvent system, and is free of other ingredients (including other polymers, monomers, or oligomers). However, in other embodiments, additional ingredients can optionally be included in the composition, such as adhesion promoters, antioxidants, UV absorbers, and combinations thereof. These ingredients can simply be dispersed or dissolved in the solvent system with the polyimide. Ingredients which are preferably excluded from the composition include crosslinking agents, surfactants, and plasticizers. The term "crosslinking agents" is used herein interchangeably with "crosslinker" and includes aminoplasts, cresols, epoxies, polyols, anhydrides, glycidyl ethers, vinyl ethers, melamines, glycolurils, benzoguanamines, and mixtures thereof. The composition preferably comprises less than about 5% by weight crosslinking agent, more preferably less than about 2% by weight crosslinking agent, even more preferably less than about 0.5% by weight, based upon the total weight of solids in the composition taken as 100% by weight, and even more preferably is substantially free of crosslinking agents. The composition preferably comprises less than about 1% by weight surfactant, more preferably less than about 0.5% by weight surfactant based upon the total weight of the composition taken as 100% by weight, and even more preferably is substantially free of surfactants. Likewise, the composition preferably comprises less than about 1% by weight plasticizer, more preferably less than about 0.5% by weight plasticizer based upon the total weight of the solids in the composition taken as 100% by weight, and even more preferably is substantially free of plasticizers.

Regardless of the embodiment, the composition is formed by dispersing or dissolving the polyimide in the solvent system. The composition can then be applied to a substrate to form an optically transparent film. The optically transparent film can be formed by any known application method, with one preferred method being spin-coating the composition at speeds of from about 300 to about 3,000 rpm (preferably from about from about 1,000 to about 2,000 rpm) for a time period of from about 30 to about 180 seconds (preferably from about 30 to about 60 seconds). After the composition is applied, it is preferably heated to a temperature of from about 150° C. to about 250° C., and more preferably from about 180° C. to about 205° C. and for time periods of from about 30 seconds to about 300 seconds (preferably from about 60 seconds to about 180 seconds) to drive off the solvents and yield a void free film suitable for forming transparent composites, as described herein.

In a further embodiment of the invention, the optically transparent composition comprises polyimides of formula (I) in a solid or powder form. That is, the composition is free of solvents (i.e., less than about 2% by weight, preferably less than about 1% by weight, and more preferably about 0% by weight solvent). The composition can be formed into an optically transparent film by extruding the polyimide into a film, followed by hot pressing the film to yield a transparent composite. Additional ingredients can be included in the composition, as described above. However, in some embodiments, it is preferred that the composition consist essentially (or even consist) of the solid polyimides of formula (I), and is free of other ingredients (including other polymers, monomers, or oligomers).

Regardless of the embodiment, the resulting polyimide films have enhanced optical transparency through the optical wavelength range of 400-700 nm, with minimal or no coloration. Preferably, the polyimide films have a refractive index of from about 1.50 to about 1.70, and more preferably from about 1.55 to about 1.65 in the visible range (633 nm). The polyimide films preferably have a % transmittance of from about 80% to about 99%, more preferably from about 90% to about 99%, and even more preferably from about 95% to about 99% at 633 nm.

The inventive polyimides are suitable for use in forming optically transparent composites, according to conventional methods using the polyimide composition as the binder for the composite. In general, these composites will comprise a polymer binder or matrix comprising the inventive polyimides and a filler embedded within or bonded to the polymer binder or matrix. The filler and polymer matrix preferably have substantially the same refractive indices to yield a colorless, optically transparent composite. That is, the refractive index of the filler is preferably within about 0.1% of the polymer matrix refractive index at wavelengths between about 400 and about 700 nm. Suitable fillers are selected from the group consisting of glass, quartz, transparent minerals, transparent ceramics, and combinations thereof. In one embodiment, the composite comprises a polymer matrix and a plurality of glass fibers or ribbons embedded in the matrix. In another embodiment, the polymer matrix is in the form of an optically transparent film bonded to a filler substrate (e.g., one or more sheets of glass laminated with the polyimide film). Methods of forming such composites are known in the art, such as co-extrusion of the polymer matrix and filler, or spin coating of the polymer composition and filler into a film.

EXAMPLES

The following examples set forth methods in accordance with the invention. It is to be understood, however, that these examples are provided by way of illustration and nothing therein should be taken as a limitation upon the overall scope of the invention.

Example 1

Polyimide Formulation 1

In this Example a polyimide composition was prepared by dissolving 2.89 grams (0.0065 mol) of 2,2-bis(3,4-dicarboxyphenyl)hexafluoropropane dianhydride (Chriskev Company, Inc., Lenexa, Kans.) and 2.28 grams (0.0060 mol) of 9,9-bis(4-amino-3-methylphenyl)fluorene (TCI America, Portland, Oreg.) in N,N'-dimethyl acetamide (Sigma-Aldrich, St. Louis, Mo.) to a final concentration of 15% by weight solids, followed by stirring at 60° C. under inert atmosphere for 24 hours. Next, toluene was added to the resulting amic acid solution to form an azeotropic solution and remove water during imidization. Imidization was then carried out by heating the solution to 150° C. for an additional 12 hours. The resulting imide solution was spin coated onto a silicon wafer at 1,500 rpm for 60 seconds, followed by baking at 205° C. for 180 seconds to form a void-free homogeneous film.

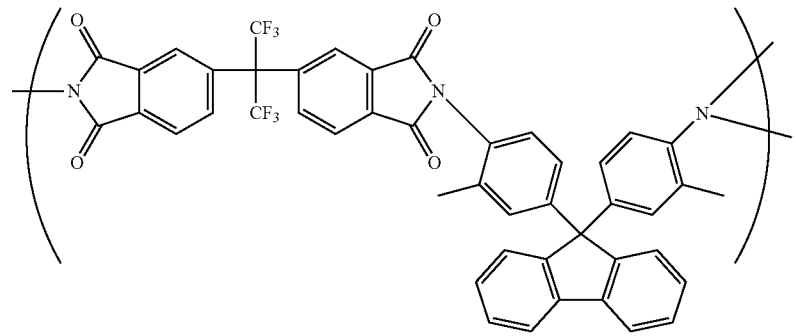

Polyimide 1

Example 2

Polyimide Formulation 2

In this Example, a further polyimide composition was prepared by dissolving 2.58 grams (0.0040 mol) of 2,2-bis(3,4-dicarboxyphenyl)hexafluoropropane dianhydride (Chiskev Company, Inc.) and 3.00 grams (0.0056 mol) of 9,9-bis(4-(4-aminophenoxyphenyl))fluorene (JFE Chemical Corporation, Tokyo, Japan) in N,N'-dimethyl acetamide to a final concentration of 18% by weight solids, followed by stirring at 60° C. under inert atmosphere for 24 hours. Next, toluene was added to the resulting amic acid solution to form an azeotropic solution, and remove water during imidization. Imidization was then carried out by heating the solution to 150° C. for an additional 12 hours. The resulting imide solution was spin coated onto a silicon wafer at 1,500 rpm for 60 seconds, followed by baking at 205° C. for 180 seconds to form a void-free homogeneous film.

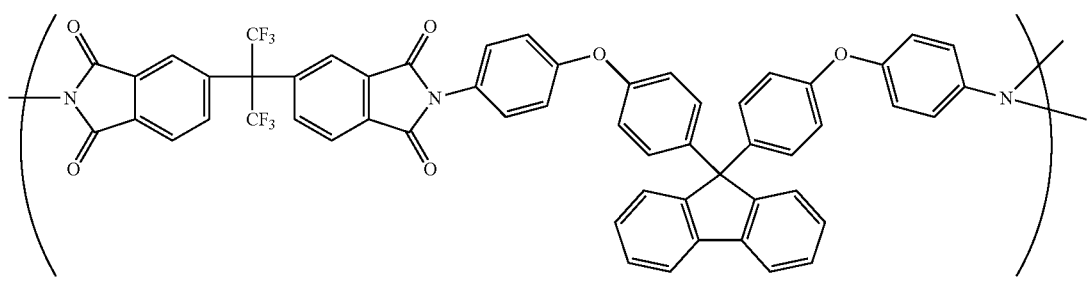

Polyimide 2

Example 3

Polyimide Formulation 3

In this Example, another polyimide composition was prepared by dissolving 2.59 grams (0.004 mol) of 99-bis (4-(3,4-dicarboxyphenoxy)phenyl)fluorene dianhydride and 2.06 grams (0.004 mol) of 2,2-bis[4-(4-aminophenoxy phenyl)] hexafluoropropane (Chriskev Company, Inc.) in N,N-dimethyl acetamide to a final concentration of 14% by weight solids, followed by stirring at 60° C. under inert atmosphere for 24 hours. Next, toluene was added to the resulting amic acid solution to form an azeotropic solution and remove water during imidization. Imidization was then carried out by heating the solution to 150° C. for an additional 12 hours. The resulting imide solution was spin coated onto a silicon wafer at 1,500 rpm for 60 seconds, followed by baking at 205° C. for 180 seconds to form a void-free homogeneous film.

resulting imide solution was spin coated onto a silicon wafer at 1,500 rpm for 60 seconds, followed by baking at 205° C. for 180 seconds to form a void-free homogeneous film.

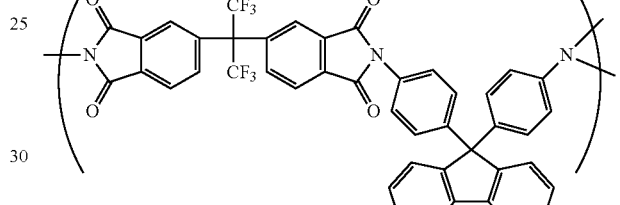

Polyimide 4

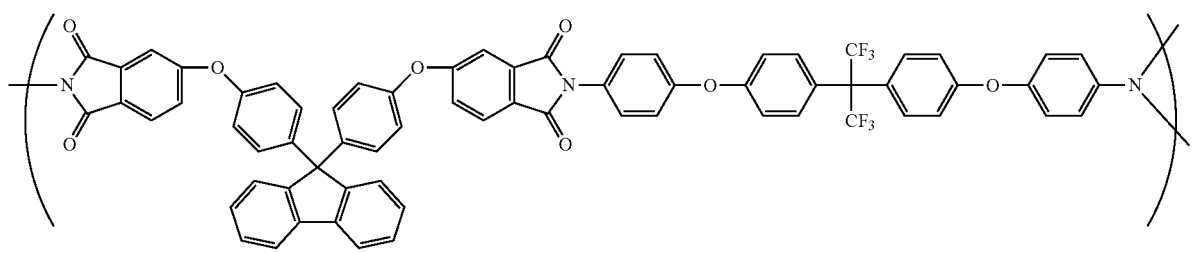

Polimide 3

Example 4

Polyimide Formulation 4

In this Example, another polyimide composition was prepared by dissolving 11.28 grams (0.0255 mol) of 2,2-bis(3,4-dicarboxyphenyl)hexafluoropropane dianhydride (Chriskev Company, Inc.) and 8.84 grams (0.0254 mol) of 9,9-bis(4-aminophenyl)fluorene (Chriskev Company, Inc.) in N,N'-dimethyl acetamide to a final concentration of 10% by weight solids, followed by stirring at 60° C. under inert atmosphere for 24 hours. Next, toluene was added to the resulting amic acid solution to form an azeotropic solution and remove water during imidization. Imidization was then carried out by heating the solution to 150° C. for an additional 12 hours. The

Example 5

Analysis of Synthesized Polyimides

The polyimide compositions from Examples 1 to 4 were each spin coated onto a silicon wafer at 1,500 rpm for 60 seconds, followed by baking at 205° C. for 180 seconds to form a void-free homogeneous film. The refractive index (n) and thermo-optic coefficient (|dn/dT|) of each composition was then determined. Refractive index and thermo-optic coefficient measurements were carried out on a prism coupler (Metricon Model 2010; Metricon Corp., Pennington, N.J.) equipped with a temperature-controlling apparatus. The refractive indices were measured in the visible range (633 nm) at room temperature (25° C.) and dn/dT values were obtained in the temperature range of 25° C.-80° C. The results are listed in Table 1. The results suggest that the polymers have potential application in transparent composites and optical applications.

TABLE 1

Optical Properties of Synthesized Polyimides

| Samples | Refractive index (633 nm) | dn/dT ($\times 10^{-6}$) |
|---|---|---|
| Example 1 | 1.65885 | −85 |
| Example 2 | 1.61815 | −102 |
| Example 3 | 1.55265 | −102 |
| Example 4 | 1.61465 | −67 |

We claim:

1. A polymer comprising recurring monomeric units of the following formula:

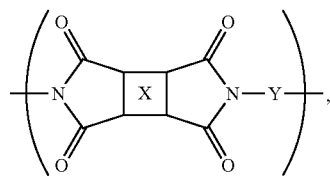
(I)

wherein at least one of X or Y comprises a fluorinated moiety and the other of X or Y comprises a fluorene derivative.

2. The polymer of claim 1, wherein X comprises a fluorinated moiety, and Y comprises a fluorene derivative.

3. The polymer of claim 2, wherein X is a tetravalent residue of a fluorinated aromatic compound having from about 6 to about 20 carbon atoms.

4. The polymer of claim 3, wherein X is selected from the group consisting of fluorinated pyromellitic groups, fluorinated polycyclic groups, and moieties of the following formula

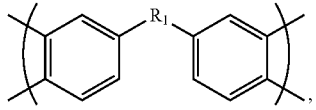

where $R_1$ is selected from the group consisting of —C(CF$_3$)$_2$—, —CF$_2$—, and —C(CF$_3$)(CH$_3$)—.

5. The polymer of claim 2, wherein Y is a divalent fluorene compound selected from the group consisting of fluorene diamine derivatives, phenoxy fluorene diamine derivatives, and combinations thereof.

6. The polymer of claim 5, wherein Y is selected from the group consisting of

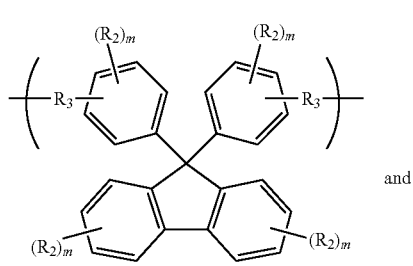

and

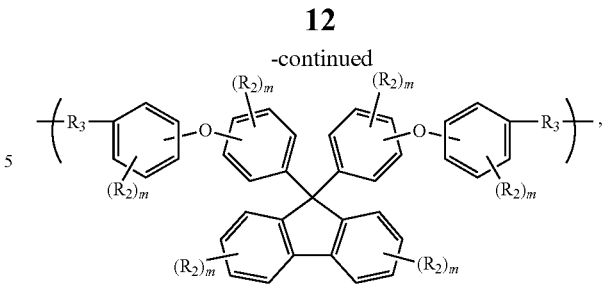

where each m is individually 0 to 4, each $R_2$ is individually selected from the group consisting of halogen, alkyl, hydroxyl, carboxyl, sulfone, nitro, cyano, and substituted and unsubstituted phenyl groups, and each $R_3$ is individually selected from the group consisting of alkyl, alkoxy, phenyl, and phenoxy groups.

7. The polymer of claim 1, wherein X comprises a fluorene derivative and Y comprises a fluorinated moiety.

8. The polymer of claim 7, wherein X is a tetravalent residue of a phenoxy fluorene derivative selected from the group consisting of tetravalent moieties of the following formula:

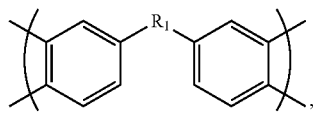

where $R_1$ is selected from the group consisting of —(O—$R_4$—O)—, and $R_4$ is selected from the group consisting of:

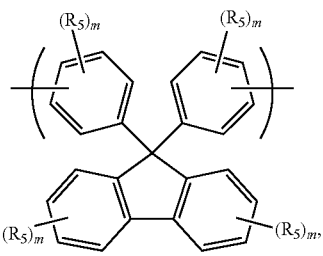

where each m is individually 0 to 4, and each $R_5$ is individually selected from the group consisting of halogen, alkyl, hydroxyl, carboxyl, sulfone, nitro, cyano, and substituted and unsubstituted phenyl groups.

9. The polymer of claim 7, wherein Y is a fluorinated aromatic moiety selected from the group consisting of

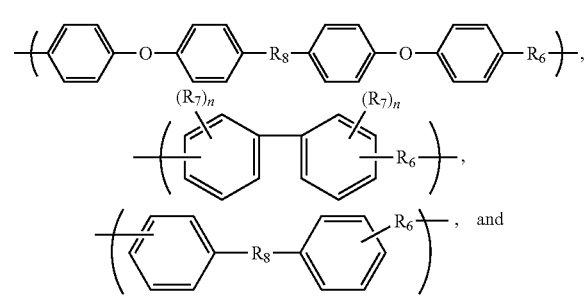, and

-continued $$\left(\left(\bigcirc\!\!-\!\!R_6\right)_n\right),$$

where:
each n is individually 1 to 4;
each $R_6$ is individually selected from the group consisting of alkyl, alkoxy, phenyl, and phenoxy groups;
each $R_7$ is individually selected from the group consisting of —F, —$CF_3$, and —$(CH_2)_k(CF_2)_jCF_3$, where k is 0 to 8, and j is 0 to 20; and
each $R_8$ is individually selected from the group consisting of —$C(CF_3)_2$—, —$CF_2$—, and —$C(CF_3)(CH_3)$—.

10. The polymer of claim 1, said polymer having an absolute dn/dT value of from about $30\times10^{-6}$ to about $120\times10^{-6}$, at temperatures ranging from about 25° C. to about 80° C.

11. A composition comprising a polymer dispersed or dissolved in a solvent system, said polymer comprising recurring monomeric units of the following formula:

$$(I)$$

wherein at least one of X or Y comprises a fluorinated moiety and the other of X or Y comprises a fluorene derivative.

12. The composition of claim 11, wherein X comprises a fluorene derivative and Y comprises a fluorinated moiety.

13. The composition of claim 11, wherein X comprises a fluorinated moiety and Y comprises a fluorene derivative.

14. The composition of claim 11, wherein said solvent system comprises a polar solvent selected from the group consisting of N-methylpyrrolidone, γ-butyrolactone, N,N'-dimethylformamide, dimethyl sulfoxide, N,N'-dimethyl acetamide, and mixtures thereof.

15. The composition of claim 11, said composition being substantially free of crosslinking agents, surfactants, and plasticizers.

16. The combination of:
a substrate having a surface; and
an optically transparent film adjacent said substrate surface, said film comprising a polymer comprising recurring monomeric units of the following formula:

$$(I)$$

wherein at least one of X or Y comprises a fluorinated moiety and the other of X or Y comprises a fluorene derivative.

17. The combination of claim 16, said film consisting essentially of said polymer of formula (I).

18. The combination of claim 16, wherein said substrate is selected from the group consisting of glass, quartz, transparent minerals, and transparent ceramics.

19. A method of forming an optically transparent composite, said method comprising:
providing a substrate having a surface; and
forming a film on said substrate surface, said film comprising a polymer comprising recurring monomeric units of the following formula:

$$(I)$$

wherein at least one of X or Y comprises a fluorinated moiety and the other of X or Y comprises a fluorene derivative.

20. The method of claim 19, wherein said forming comprises spin-coating a polyimide composition onto said substrate surface, said polymer being dispersed or dissolved in a solvent system.

21. The method of claim 19, wherein said forming comprises extruding a solid polymer into a film on said substrate surface.

22. The method of claim 19, further comprising hot pressing said film to yield said optically transparent composite.

23. An optically transparent composite comprising a polymer matrix and a filler embedded in or bonded to said polymer matrix, wherein said matrix comprises a polymer comprising recurring monomeric units of the following formula:

$$(I)$$

wherein at least one of X or Y comprises a fluorinated moiety and the other of X or Y comprises a fluorene derivative.

24. The composite of claim 23, wherein said filler is selected from the group consisting of glass, quartz, transparent minerals, transparent ceramics and combinations thereof.

25. The composite of claim 24, wherein said filler comprises a plurality of glass fibers or ribbons embedded in said matrix.

26. The composite of claim 23, wherein said filler and said matrix have substantially the same refractive indices at about 400-700 nm.

27. The composite of claim 23, wherein said matrix consists essentially of said polymer.

* * * * *